United States Patent
Miwa et al.

(10) Patent No.: US 9,857,783 B2
(45) Date of Patent: Jan. 2, 2018

(54) SETTING PROGRAM, DEVICE CONTROL APPARATUS, AND SETTING METHOD

(71) Applicant: SEIKO EPSON CORPORATION, Tokyo (JP)

(72) Inventors: Shiro Miwa, Nagano (JP); Takeshi Takeuchi, Nagano (JP); Kimihiro Kawano, Nagano (JP); Kentaro Kanada, Nagano (JP); Atsushi Suzuki, Nagano (JP); Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 402 days.

(21) Appl. No.: 14/453,993

(22) Filed: Aug. 7, 2014

(65) Prior Publication Data

US 2015/0081050 A1 Mar. 19, 2015

(30) Foreign Application Priority Data

Sep. 18, 2013 (JP) .................................. 2013-193277

(51) Int. Cl.
G05B 15/02 (2006.01)
G06F 3/048 (2013.01)
G06F 9/44 (2006.01)

(52) U.S. Cl.
CPC .............. G05B 15/02 (2013.01); G06F 3/048 (2013.01); G06F 9/4411 (2013.01); G06F 9/4446 (2013.01)

(58) Field of Classification Search
CPC ....... G05B 15/02; G06F 3/048; G06F 9/4411; G06F 9/4446

USPC ...................................................... 700/83, 90
See application file for complete search history.

(56) References Cited

U.S. PATENT DOCUMENTS

| 6,721,879 | B1 * | 4/2004 | Tanaka | G06F 1/24 713/1 |
| 2007/0011312 | A1 | 1/2007 | Nakamura | |
| 2010/0225967 | A1 * | 9/2010 | Shiohara | H04W 76/02 358/1.15 |
| 2011/0222118 | A1 * | 9/2011 | Mukaiyama | G06F 3/1203 358/1.15 |

FOREIGN PATENT DOCUMENTS

| JP | 2006-333321 A | 12/2006 |
| JP | 2011-183761 A | 9/2011 |

* cited by examiner

*Primary Examiner* — Yuhui R Pan
(74) *Attorney, Agent, or Firm* — Global IP Counselors, LLP (57) ABSTRACT

A non-transitory computer readable medium has stored thereon a setting program for setting a computer to control a device. The setting program a display control function configured to execute on the computer a display process for displaying an image on a screen that sequentially guides setup procedure for the device, and a setting control function configured to execute on the computer a setting process including at least installation of a software necessary for the computer to control the device. The setting control function is further configured to execute on the computer the setting process in parallel with the display process by the display control function.

7 Claims, 6 Drawing Sheets

SETTING PROGRAM, DEVICE CONTROL APPARATUS, AND SETTING METHOD

CROSS-REFERENCE TO RELATED APPLICATIONS

This application claims priority to Japanese Patent Application No. 2013-193277 filed on Sep. 18, 2013. The entire disclosure of Japanese Patent Application No. 2013-193277 is hereby incorporated herein by reference.

BACKGROUND

Technical Field

The present invention relates to a setting program for setting a computer to a state capable of controlling a device, a device control apparatus, and a setting method for setting a computer to a state capable of controlling a device.

Related Art

A user of a printer (one type of device) performs the work of connecting the printer to a PC (computer) to achieve a state of the printer being able to be controlled by the computer (printer setup). This kind of setup includes various processes such as various types of operations by the user on the printer, installation of printer drivers to the computer and the like. Setup is normally realized by these various processes progressing in a predetermined sequence according to the instructions of a program called a setup program.

Systems are known that execute the printer setup by sequentially displaying on a PC screen a printer driver installation procedure screen using a USB or a wireless network installation procedure screen using a USB (see JP-A-2006-333321 (Patent Document 1), for example).

SUMMARY

Considering user convenience and comfort, it is preferable to shorten the time required for setup as much as possible. With the setup according to conventional setup programs, there was still room for a mechanism for shortening the time in this way. Also, with the document noted above as well, there was no suggestion of a mechanism for shortening the time in this way.

The present invention is conceived at least to address the problems described above, and an advantage is to provide a setting program, a device control apparatus, and a setting method for which it is possible to shorten the time needed for the processes required for achieving a state by which a device can be controlled.

One aspect of the present invention is a non-transitory computer readable medium having stored thereon a setting program for setting a computer to control a device. The setting program includes a display control function configured to execute on the computer a display process for displaying an image on a screen that sequentially guides setup procedure for the device, and a setting control function configured to execute on the computer a setting process including at least installation of a software necessary for the computer to control the device. The setting control function is further configured to execute on the computer the setting process in parallel with the display process by the display control function.

With this configuration, the display process for displaying the image on the screen for sequentially guiding the setup procedure for the device and the setting process including at least the installation of the software necessary for the computer to control the device are performed in parallel. Because of that, compared to a conventional configuration with which these two processes are not performed in parallel (these two processes are performed in sequence), it is possible to significantly shorten the overall time required until setting of the computer to a state in which it can control the device ends (device setup ends).

With one aspect of the present invention, the display process includes at least a process of displaying an image that guides to turn on power of a printer as the device, and an image that guides to set an ink cartridge in the printer.

With this configuration, the setting process (the software installation and the like) is performed in parallel with turning on the power to the printer or setting the ink cartridge in the printer by the user according to the display of these images. Because of that, compared to a conventional configuration with which the installation and the like is performed after the operations of turning on the power or setting the ink cartridge according to the display of these images, it is possible to significantly shorten the overall time required for setup of the printer.

With one aspect of the present invention, the setting process includes a wireless LAN setting process for setting in the device information necessary for having the device join a wireless LAN that the computer joins.

With this configuration, up to the wireless LAN setting process for having the device join the wireless LAN is executed automatically in parallel with the display process. Because of that, a significant shortening of the time required for setting up of the device including that wireless LAN setting process and a significant reduction of user trouble are realized.

When power is turned on, the device is configured to respond to the wireless LAN setting process from the computer and shift to a connection setting enabled state for establishing a wireless LAN connection. Also, the display process includes a process of displaying an image that guides to turn on power of the device, and the wireless LAN setting process is configured to establish a wireless connection with the device in the connection setting enabled state after the image that guides to turn on the power of the device has been displayed by the display process.

With one aspect of the present invention, the setting control function is configured to instruct to the device via the wireless LAN to execute a trial run after the wireless LAN setting process.

With this configuration, the series of processes including the software installation, the wireless LAN setting process, and the trial run on the device via the wireless LAN is automatically executed alongside the display process. Because of that, a significant shortening of the time required for setting up the device including that trial run and a significant reduction in trouble for the user are realized.

With one aspect of the present invention, the display process and the setting process are executed in parallel in response to the non-transitory computer readable medium being inserted into the computer and the setting program being activated.

In other words, with the non-transitory computer readable medium on which the setting program is recorded being inserted in the computer as a trigger, the display process and the setting process are executed in parallel, so it is possible to have an extremely small burden placed on the user for doing device setup.

The technical concept of the present invention can also be realized using other items or methods than the setting program like that described above. For example, it is possible to also regard a recording medium that can be read by a computer on which the setting program is recorded as the invention. It is also possible to respectively regard the apparatus in charge of the computer that executes each process according to the setting program described above (device control apparatus) and the method having each step in charge of each process executed by this kind of computer (device control apparatus) (setting method) as inventions. It is also possible to regard the system including the computer (device control apparatus) and device described above as one invention.

BRIEF DESCRIPTION OF THE DRAWINGS

Referring now to the attached drawings which form a part of this original disclosure.

DETAILED DESCRIPTION OF EMBODIMENTS

Following, we will describe an embodiment of the present invention while referring to drawings.

Figure 1:
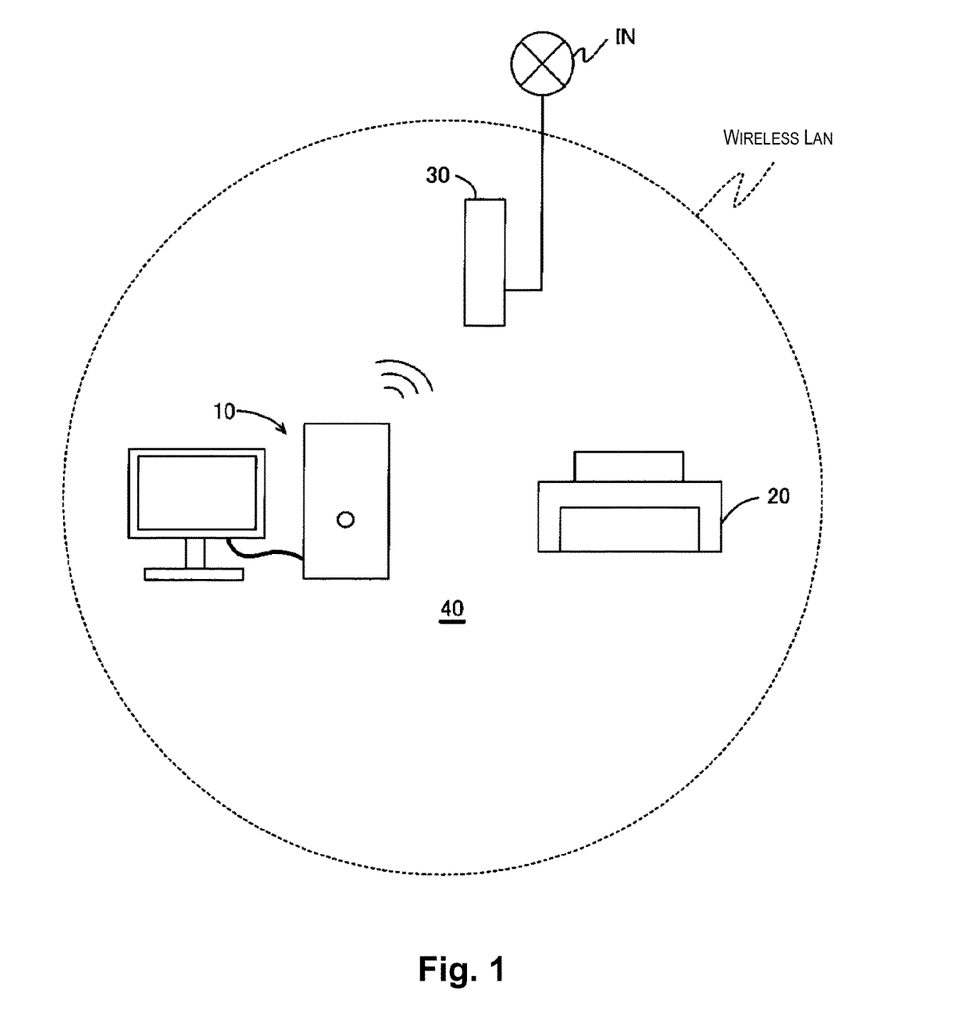
FIG. 1 is a drawing showing an example of a situation in which the system of this embodiment is applied.

FIG. 1 shows an example of a situation in which a system 40 of the present invention is applied. The system 40 includes at least a computer 10, and a printer 20 that is controlled by the computer 10. The computer 10 is an example of the "device control apparatus," and the printer 20 is an example of the "device." With this embodiment, the computer 10 is set to a state for which it is able to control the printer 20. In other words, the printer 20 setup is performed.

In FIG. 1, a wireless LAN is constructed in a fixed area including a wireless LAN (Wireless Local Area Network) router 30. The computer 10 has a wireless communication function, and behaves as a child device to the router 30 as a parent device. The router 30 is connected to an external network (internet IN), so the computer 10 can be connected to an external network via the router 30. The router 30 can be a model that handles only wireless communication, or can be a model that also handles wired communication. The printer 20 also has a wireless communication function, and can be a child device (however, in FIG. 1, an example is shown of the printer 20 in a state still not joined to the wireless LAN).

Figure 2:
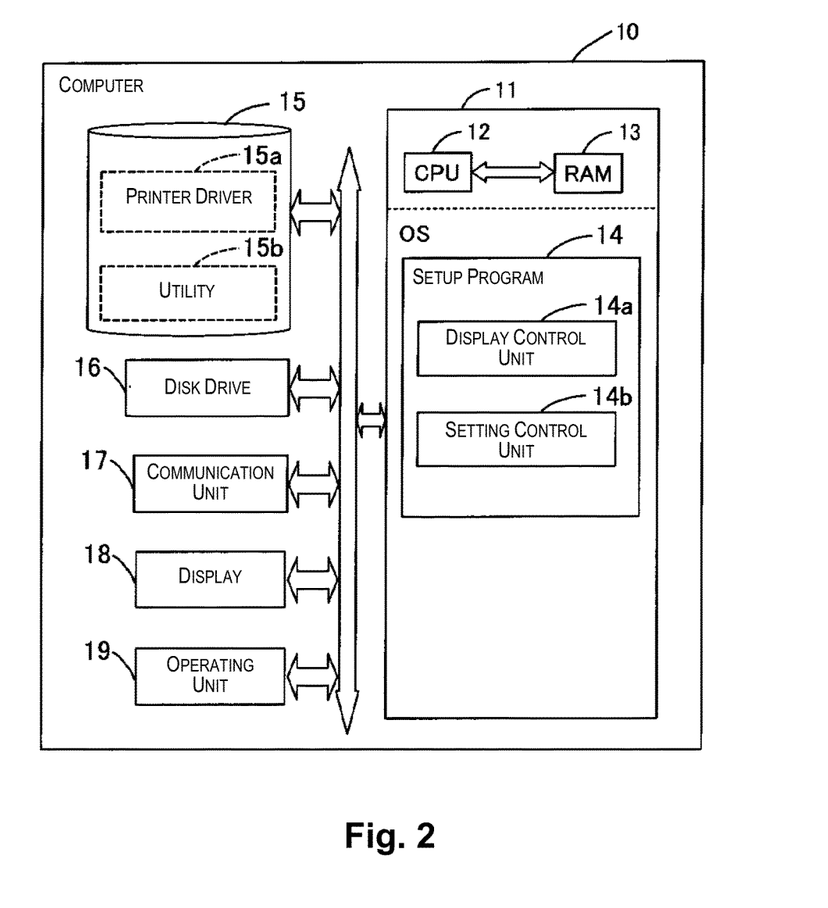
FIG. 2 is a drawing schematically showing the computer configuration.

FIG. 2 schematically shows the hardware configuration and software configuration of the computer 10. The computer 10 has a control unit 11, a hard disk drive (HDD) 15, a disk drive 16, a communication unit 17, a display 18, an operating unit 19 and the like.

With the control unit 11, a CPU 12 opens various programs in a RAM 13 and performs processing according to that program under the operating system. With this embodiment, by the CPU 12 performing processing according to a setup program 14 read from a designated recording medium, the functions of a display control unit 14a and a setting control unit 14b are realized. These functions will be described later. The setup program 14 is an example of a setting program that sets the computer 10 to a state in which it can control the device (printer 20).

A recording medium (optical disk) (not illustrated) is inserted into the disk drive 16 by the user. That recording medium is bundled with the printer 20 that is to undergo setup, and the setup program 14 is recorded on it. The control unit 11 is able to read the setup program 14 from that recording medium by the disk drive 16 being driven to start the reading of that recording medium. Of course, the recording medium that is the reading source of the setup program 14 can also be USB memory, a memory card or the like, and the USB memory, memory card or the like can also be inserted in a port (not illustrated) in the computer 10.

The communication unit 17 is in charge of the communication function described above, and the control unit 11 executes communication with the outside via the wireless LAN by controlling the communication unit 17. Also, the communication unit 17 also handles wireless communication using an ad hoc mode as described later. A guide image or the like for setup is displayed on the display 18 under the control of the control unit 11. The operating unit 19 is realized using a keyboard, a mouse, various types of buttons, a touch pad, a touch panel or the like. Instructions needed for each process are input via the operating unit 19 by the user. All or a part of the HDD 15, the disk drive 16, the communication unit 17, the display 18, and the operating unit 19 can be built into the computer 10, or can be attached externally to the computer 10. Also, the computer 10 can be in various forms such as a desktop type, a laptop type, a tablet type or the like. Also, the device control apparatus is a concept including all products that can actualize the same level operation as that of the computer 10 described with this embodiment, and can also be an item further equipped with other functions (e.g. a call function or the like).

Figure 3:
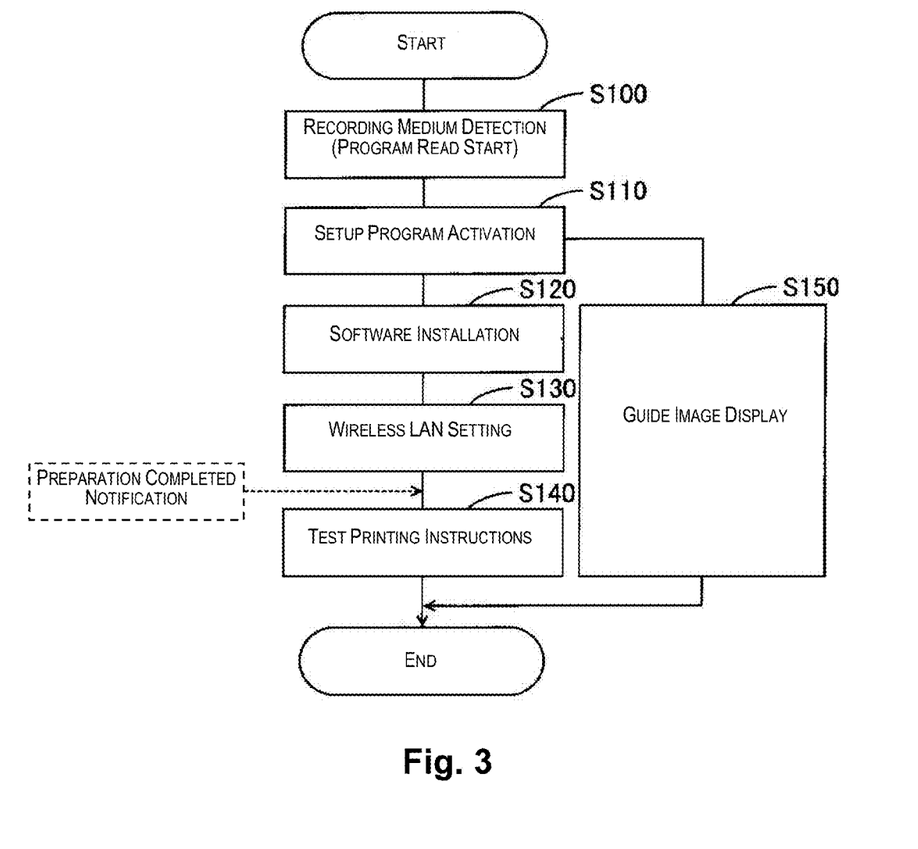
FIG. 3 is a flow chart showing the setup process.

FIG. 3 shows the setup process of this embodiment using a flow chart. This flow chart can also be said to show the setting method for setting the computer 10 to a state for which it can control the device (printer 20). That flow chart is realized using the control unit 11 (CPU 12).

At step S100, the CPU 12 detects that the recording medium on which the setup program 14 is recorded has been inserted in the computer 10. With this detection as a trigger, the CPU 12 starts the reading of the setup program 14 from that recording medium to the RAM 13. By doing this, the setup program 14 is activated (step S110).

When the setup program 14 is activated, the setup program 14 has the CPU 12 execute the processes from step S120 and thereafter (setting process) in parallel with the process of step S150 (display process).

With the display process, the display control unit 14a displays on the display 18 screen a guide image for sequentially guiding the user on the setup procedure for the printer 20.

Figure 4A:
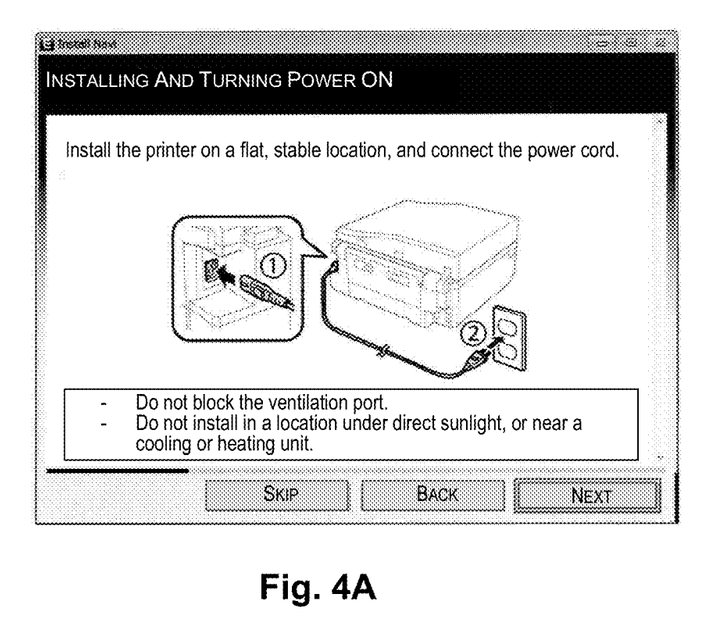
FIGS. 4A and 4B are drawings showing an example of a guide image.
Figure 4B:
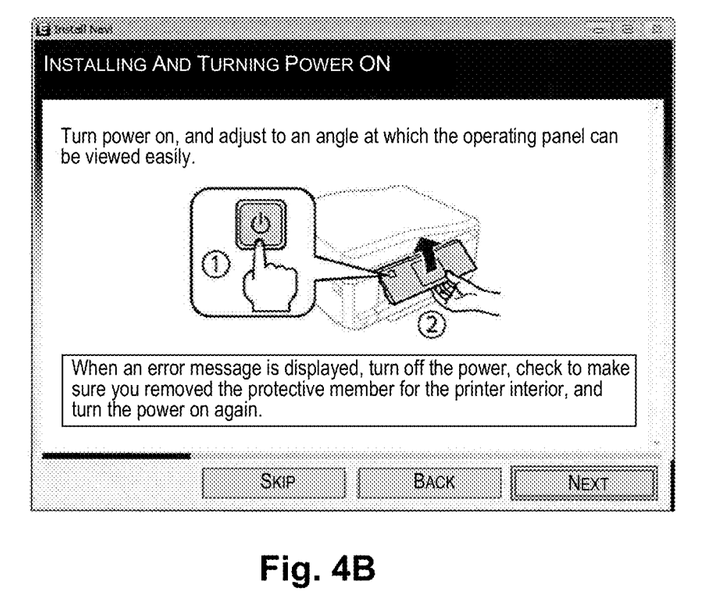

FIG. 4A and FIG. 4B are examples of guide images displayed in the display process. FIG. 4A and FIG. 4B are respectively guide images for guiding a portion of the procedure for turning on power to the printer 20. The user is able to perform turning the power on to the printer 20 without error by operating according to this guide image. By operating the operating unit 19 and clicking "Next" in the guide image, the user can update the guide image currently displayed to the next guide image (the same is also true for FIGS. 5A, 5B, 6A and 6B described later). The printer 20 is activated by the power being turned onto the printer 20 by the user operating according to the guide screen. Also, the printer 20 shifts to a specific mode (connection setting possible state) for establishing a wireless LAN connection in response to the wireless LAN setting process (described later) from the computer 10 side.

Figure 5A:
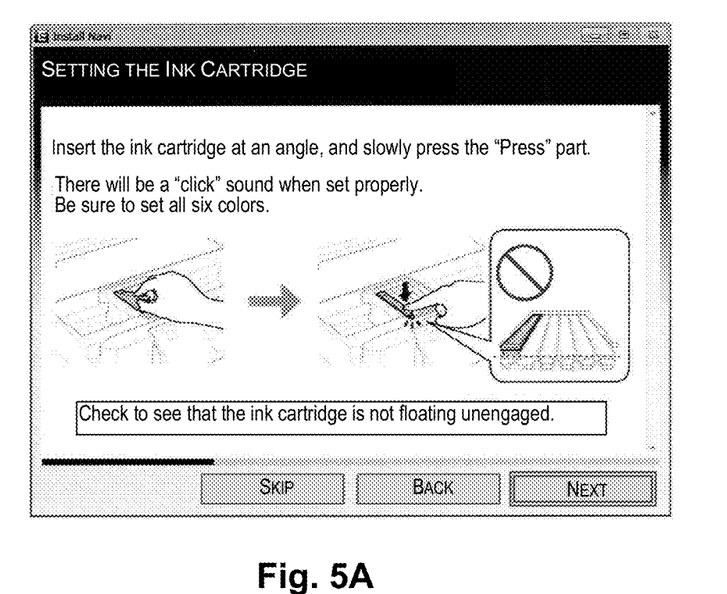
FIGS. 5A and 5B are drawings showing another example of a guide image.
Figure 5B:
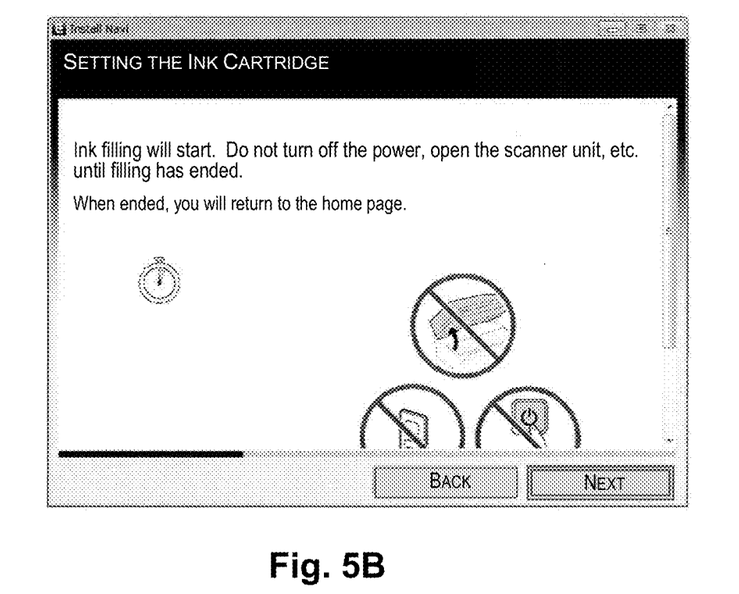

FIG. 5A and FIG. 5B are examples of guide images displayed in the display process. FIG. 5A and FIG. 5B are respectively guide images for guiding a portion of the procedure for setting the ink cartridge in the printer 20 in a state with the power turned on. By operating according to this kind of guide image, the user is able to perform attaching of the ink cartridge to the printer 20 (FIG. 5A) and filling of the ink (FIG. 5B) without error. The time required until completion for this kind of attaching of the ink cartridge after the power is turned on to the printer 20, and furthermore filling of ink from the ink cartridge to the printer 20, has some variation depending on each user, but is roughly expected to be around 13 to 15 minutes.

Meanwhile, with the setting process, the setting control unit 14b has the software necessary for controlling the printer 20 installed (step S120). In other words, software installation is executed with the display process of each type of guide image (step 150) in the background. The printer driver for driving the printer 20, various types of utility software and the like are applicable as the software necessary for controlling the printer 20. The printer driver or utility software are saved in the HDD 15 as a printer driver 15a and a utility 15b, in a state that can be activated under the operating system. At the point that the step S120 is executed, the setup program 14 (setting control unit 14b) can be said to be an installer.

The printer driver and utility software are stored in the recording medium in which the setup program 14 is recorded, and can also be read from that recording medium and installed. Alternatively, the printer driver and utility software can also be installed by being downloaded to the computer 10 via the wireless LAN (see FIG. 1) from a site on the internet IN supplied by the manufacturer of the printer 20. The software installation at step S120 is expected to be completed in approximately 2 minutes. Therefore, during the time that the user is executing the operations on the printer 20 while viewing each guide image shown by example in FIGS. 4A, 4B, 5A and 5B, the installation of the required software to the computer 10 can be said to be completed.

Furthermore, with the setting process, the setting control unit 14b executes the wireless LAN setting process that sets the information needed for the printer 20 to join the wireless LAN (see FIG. 1) in the printer 20 (step S130). This step S130 is automatically executed in sequence after the step S120. However, the setting control unit 14b can also perform this step S130 after at least a guide image (FIGS. 4A and 4B) for guiding turning on of power of the printer 20 is displayed on the display 18 by the display control unit 14a. The information necessary for the printer 20 to join the wireless LAN is an SSID for identifying the network (wireless LAN), an encryption method set in the router 30, a password required for encrypting or decrypting information used with that encryption method and the like. This kind of information such as the SSID, encryption method, and password is held in the computer 10 that has joined the wireless LAN already. In light of that, the setting control unit 14b controls the communication unit 17 and temporarily builds ad hoc mode communication with the printer 20 that is in a state for which connection setting is possible, and by that built communication, the information including the SSID, the encryption method, and the password are notified to the printer 20. The printer 20 that receives notification of this information uses the information to thereafter realize joining the wireless LAN built by the router 30 (establishes a wireless LAN connection).

To build the ad hoc mode communication described above, it is essential that the power be turned on at the printer 20 side, but by instruction of the guide images shown in FIGS. 4A and 4B, it can be said that the power has basically already been turned on at the printer 20 side at the timing of step S130. Also, the ad hoc mode communication has a weak aspect in terms of security compared with infrastructure mode communication via the wireless LAN parent device (router 30). Because of that, at the time of step S130, the setting control unit 14b provides a limit regarding distance and time, and detects whether or not there is a device for which wireless communication is possible in the periphery within that limited range (device in a state for which connection setting is possible), and when detection succeeds, ad hoc mode communication is temporarily built with that detected device (printer 20). Meanwhile, when that detection fails, ad hoc mode communication building is halted.

When it is not possible to build the ad hoc mode communication as described above, the display control unit 14a can also display a message notifying failure of the wireless LAN setting (error message) to the display 18. The user who sees this kind of message is able to turn on the power of the printer 20 (if not turned on), change the position of the printer 20, or redo a trial run of the process of step S130 on the computer 10 side. The wireless LAN setting of the step S130 is expected to be completed in approximately 3 minutes. Therefore, during the time that the user is executing an operation on the printer 20 viewing each guide image shown by example in FIGS. 4A, 4B, 5A and 5B, in addition to the installation (step S120) described above, it can be said that the wireless LAN setting (step S130) is also completed.

Figure 6A:
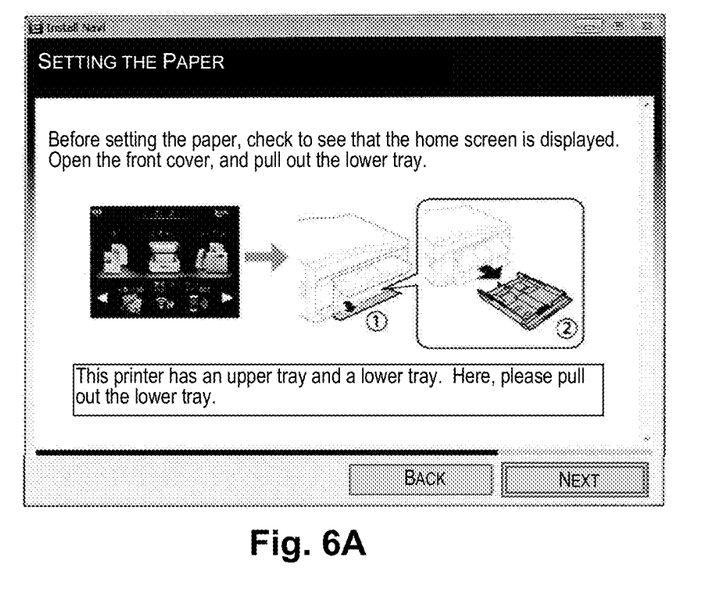
FIGS. 6A and 6B are drawings showing yet another example of a guide image.
Figure 6B:
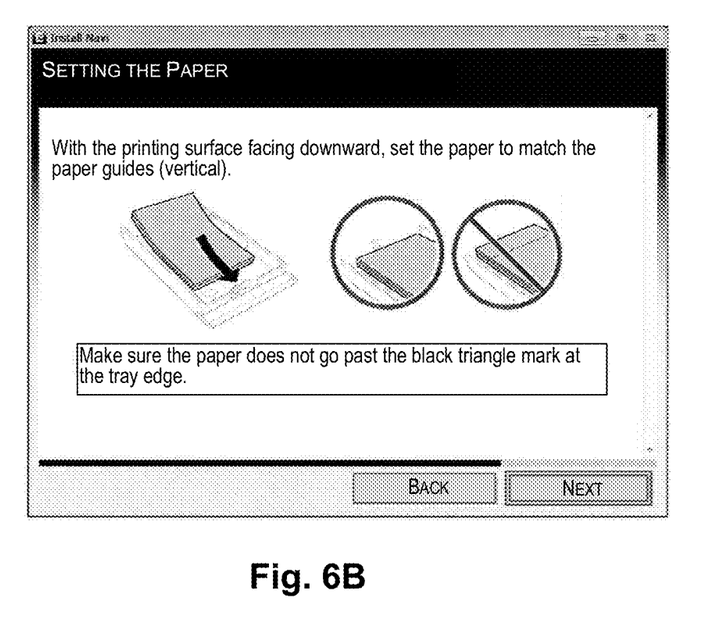

FIG. 6A and FIG. 6B are examples of guide images displayed in the display process. FIG. 6A and FIG. 6B are respectively guide images for guiding a portion of the procedure for setting paper in the printer 20 in a state in which ink filling is completed. The user is able to perform setting of the paper in the printer 20 without error by doing operations according to this kind of guide image.

Furthermore, with this setting process, the setting control unit 14b gives instructions via the wireless LAN to the printer 20 to execute a trial run (step S140). Here, a trial run means a test printing by the printer 20. However, the setting control unit 14b waits to receive a preparation completed notification from the printer 20 side via the wireless LAN to perform that step S140. In other words, the printer 20 sends the preparation completed notification to the computer 10 via the wireless LAN at the time when all of the turning on of the power, the attachment of the ink cartridge, the setting of the wireless LAN, the filling of the ink, and the setting of the paper are completed. Also, when it receives this kind of preparation completed notification, the setting control unit 14b gives test printing instructions to the printer 20 via the wireless LAN.

The test printing instructions include image data in which a test image that is subject to test printing is expressed. The printer 20 that receives the test printing instructions prints on paper the test image based on the image data contained in those instructions. The user does a visual confirmation of the test printing results, and recognizes the printer 20 setup as being completed.

FIGS. 4A, 4B, 5A, 5B, 6A and 6B simply show a portion or an example of the item displayed as the guide image in the display 18. For example, the display control unit 14a can also suitably display as the guide image (a portion thereof) a message or the like for notifying the state of the computer 10 side at that point. As an example of this kind of message, in addition to the error message described above, other possibilities include a message notifying that software is being installed at step S120, a message notifying that the wireless LAN is being set at step S130, or a message notifying that test printing is being executed or the like.

In this way, with this embodiment, with insertion of the recording medium on which the setup program 14 is recorded into the computer 10 as a trigger, the setup program 14 is activated (step S110), the process of displaying the guide image that does sequential guiding of the printer 20 setup procedure on the screen (step S150), and the setup process including at least installation of software such as the printer driver and the like (step S120 or the like) are performed in parallel. In particular, installation of the printer driver or the like on the computer 10 and setting of the wireless LAN for the printer 20 are executed in parallel and completed alongside the series of processes normally executed by the user in approximately 13 to 15 minutes including turning on the power of the printer 20, attaching the ink cartridge, and ink filling.

Because of that, compared to conventional configurations with which installation of the printer driver and the like on the computer and setting of the wireless LAN on the printer were executed after the series of operations on the printer including turning on the power of the printer, attaching the ink cartridge, filling the ink, and also setting the paper, it is possible to significantly shorten the time required for setup of the printer 20, and to improve convenience and comfort for the user. Also, with this embodiment, the process by the computer 10 of instructing setting of the wireless LAN to the printer 20 and test printing to the printer 20 after installation of the printer driver and the like is automatically executed in succession, so complexity for the user is significantly eliminated.

For the device of this embodiment, other than the printer, for example, various electronic devices are applicable, including combination machines, scanners, projectors or the like. In other words, the present invention can be applied to shorten the time required for setup for devices that are subject to setup in relation to the device control apparatus, not only to printers.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A non-transitory computer readable medium having stored thereon a setting program for setting a computer to control a device, the setting program comprising:
   a display control function configured to execute on the computer a display process for displaying an image on a screen that sequentially guides setup procedure for the device, the display process includes a process of displaying an image that guides to turn on power of a printer as the device, and a process of displaying an image that guides to set an ink cartridge in the printer; and
   a setting control function configured to execute on the computer a setting process including at least a process of installing a software necessary for the computer to control the device,
   the setting control function being further configured to execute on the computer the setting process in parallel with the display process by the display control function, thus the process of installing the software necessary for the computer to control the device is executed in parallel with at least one of the process of displaying the image that guides to turn on the power of the printer and the process of displaying the image that guides to set the ink cartridge in the printer,
   the device being configured to shift to a specific mode for establishing a wireless connection when power is turned on,
   the setting process further including a process of temporarily establishing a wireless connection with the device which has shifted to the specific mode, a process of sending wireless setting information to the device via the wireless connection that has been temporarily established, and a process of establishing a wireless connection with the device based on the wireless setting information, and
   a series of the process of temporarily establishing the wireless connection, the process of sending the wireless setting information, and the process of establishing the wireless connection being executed automatically in sequence after the process of installing the software.

2. The non-transitory computer readable medium according to claim 1, wherein
   the setting process includes a wireless LAN setting process for setting in the device information necessary for having the device join a wireless LAN that the computer joins.

3. The non-transitory computer readable medium according to claim 2, wherein
   the device is configured to respond to the wireless LAN setting process from the computer and shift to a connection setting enabled state for establishing a wireless LAN connection when power is turned on,
   the display process includes a process of displaying an image that guides to turn on power of the device, and
   the wireless LAN setting process is configured to establish a wireless connection with the device in the connection setting enabled state after the image that guides to turn on the power of the device has been displayed by the display process.

4. The non-transitory computer readable medium according to claim 2, wherein the setting control function is configured to instruct to the device via the wireless LAN to execute a trial run after the wireless LAN setting process.

5. The non-transitory computer readable medium according to claim 1, wherein the display process and the setting process are executed in parallel in response to the non-transitory computer readable medium being inserted into the computer and the setting program being activated.

6. A device control apparatus configured to control a device, the device control apparatus comprising:

a display control unit configured to execute a display process for displaying an image on a screen that sequentially guides setup procedure for the device, the display process includes a process of displaying an image that guides to turn on power of a printer as the device, and a process of displaying an image that guides to set an ink cartridge in the printer; and a setting control unit configured to execute a setting process including at least a process of installing a software necessary for controlling the device, the setting control unit being further configured to execute the setting process in parallel with the display process by the display control unit, thus the process of installing the software necessary for the computer to control the device is executed in parallel with at least one of the process of displaying the image that guides to turn on the power of the printer and the process of displaying the image that guides to set the ink cartridge in the printer, the device being configured to shift to a specific mode for establishing a wireless connection when power is turned on, the setting process further including a process of temporarily establishing a wireless connection with the device which has shifted to the specific mode, a process of sending wireless setting information to the device via the wireless connection that has been temporarily established, and a process of establishing a wireless connection with the device based on the wireless setting information, and a series of the process of temporarily establishing the wireless connection, the process of sending the wireless setting information, and the process of establishing the wireless connection being executed automatically in sequence after the process of installing the software.

7. A setting method for setting a computer to control a device, the setting method comprising:

executing on the computer a display process for displaying an image on a screen that sequentially guides setup procedure for the device, the display process includes a process of displaying an image that guides to turn on power of a printer as the device, and a process of displaying an image that guides to set an ink cartridge in the printer; and executing on the computer a setting process including at least a process of installing a software necessary for the computer to control the device, the setting process being executed on the computer in parallel with the display process, thus the process of installing the software necessary for the computer to control the device is executed in parallel with at least one of the process of displaying the image that guides to turn on the power of the printer and the process of displaying the image that guides to set the ink cartridge in the printer, the device being configured to shift to a specific mode for establishing a wireless connection when power is turned on, the setting process further including a process of temporarily establishing a wireless connection with the device which has shifted to the specific mode, a process of sending wireless setting information to the device via the wireless connection that has been temporarily established, and a process of establishing a wireless connection with the device based on the wireless setting information, and a series of the process of temporarily establishing the wireless connection, the process of sending the wireless setting information, and the process of establishing the wireless connection being executed automatically in sequence after the process of installing the software.

* * * * *